United States Patent
Chen

(10) Patent No.: US 10,670,907 B2
(45) Date of Patent: Jun. 2, 2020

(54) DISPLAY IN WHICH A PANEL IS SECURED ONTO A BACKLIGHT MODULE BY USING A POLARIZER AND A METHOD FOR MANUFACTURING THE SAME

(71) Applicants: HKC Corporation Limited, Shenzhen, Guangdong (CN); Chongqing HKC Optoelectronics Technology Co., Limited, Chongqing (CN)

(72) Inventor: Yu-Jen Chen, Chongqing (CN)

(73) Assignees: HKC Corporation Limited, Shenzhen, Guangdong (CN); Congqing HKC Optoelectronics Technology Co., Ltd., Chongqing (CN)

( * ) Notice: Subject to any disclaimer, the term of this patent is extended or adjusted under 35 U.S.C. 154(b) by 340 days.

(21) Appl. No.: 15/550,608

(22) PCT Filed: May 10, 2017

(86) PCT No.: PCT/CN2017/083675
§ 371 (c)(1),
(2) Date: Aug. 11, 2017

(87) PCT Pub. No.: WO2018/188139
PCT Pub. Date: Oct. 18, 2018

(65) Prior Publication Data
US 2019/0384104 A1    Dec. 19, 2019

(30) Foreign Application Priority Data
Apr. 12, 2017    (CN) .......................... 2017 1 0237320

(51) Int. Cl.
*G02F 1/1335*    (2006.01)

(52) U.S. Cl.
CPC ................. *G02F 1/133528* (2013.01); *G02F 2001/133567* (2013.01)

(58) Field of Classification Search
CPC .............. G02F 1/133528; G02F 2001/133567
See application file for complete search history.

(56) References Cited

U.S. PATENT DOCUMENTS

2018/0173049 A1*    6/2018    Zha ................... G02F 1/133512

FOREIGN PATENT DOCUMENTS

| CN | 102116948 A | 7/2011 |
|---|---|---|
| CN | 202404335 U | 8/2012 |
| CN | 205679894 U | 11/2016 |

OTHER PUBLICATIONS

Translation of Chinese Patent Office First Action (Year: 2016).*
Wang, CN104991302A, Oct. 2015, machine translation (Year: 2015).*

* cited by examiner

*Primary Examiner* — Tracie Y Green
(74) *Attorney, Agent, or Firm* — Juan Carlos A. Marquez; Marquez IP Law Office, PLLC

(57) ABSTRACT

This application relates to a display and a method for manufacturing the same. The display includes a backlight module, a display panel, and a polarizer, where the display panel is disposed on the backlight module, the polarizer is disposed on the display panel, and a periphery of the polarizer is designed to extend toward the backlight module, and is attached to a surface periphery of the backlight module.

6 Claims, 3 Drawing Sheets

DISPLAY IN WHICH A PANEL IS SECURED ONTO A BACKLIGHT MODULE BY USING A POLARIZER AND A METHOD FOR MANUFACTURING THE SAME

BACKGROUND

Technical Field

This application relates to a display and a method for manufacturing the same, and in particular, to a display in which a panel is secured onto a backlight module by using a polarizer, and a method for manufacturing the same.

Related Art

With development of science and technologies, products of liquid crystal displays with a plurality of advantages, such as power saving, no radiation, small volumes, low power consumption, flat squares, high resolution, and stable picture quality, are increasingly popular, so that demands for liquid crystal displays (LCDs) are greatly increased. Currently, LCDs are displays that are most widely applied in the market, and in particular, are widely applied on liquid crystal televisions. For liquid crystal televisions, in addition to the pursuit of higher definition, users also have higher requirements on appearance performance, such as being lighter and slimmer, narrow bezels, and curved surfaces.

Users and panel designers are always in pursuit of a bezel-less design. In general sense, bezel-less refers to that there is no rubber frame outside a panel, and a piece of glass is directly attached to a backlight module. Currently, a common method 1 is directly sticking a liquid crystal panel (cell) to a backlight module by using an adhesive. In this method, extension of the adhesive is likely to cause pollution to the backlight module and affect display. A method 2 is securing one end of a hook to a lower polarizer of a liquid crystal panel, and then hooking a securing element of a backlight module by using the other end of the hook. The hook needs to be tightly secured to the polarizer, and is likely to loosen if it is not properly secured. Therefore, it is not easy to disassemble the hook from the liquid crystal panel, or it is not easy to disassemble the liquid crystal panel from the backlight module. Once the hook is not well attached, it is difficult to perform reworking, and the method has a complex process.

SUMMARY

To resolve the foregoing technical problem, this application is directed to providing a display and a method for manufacturing the same, resolving a problem that it is not easy to secure a panel to a backlight module, improving a production yield of products, and simplifying a manufacturing process.

The following technical solutions are used to achieve the objective of this application and resolve the technical problems of this application. A display provided by this application comprises a backlight module, a display panel, and a polarizer. The display panel is disposed on the backlight module. The polarizer is disposed on the display panel. A periphery of the polarizer is designed to extend toward the backlight module, and is attached to a surface periphery of the backlight module.

The following technical measures may be taken to further resolve the technical problem of this application.

In an embodiment of this application, the polarizer is deflected downward and is attached to a side edge of the backlight module.

In an embodiment of this application, the polarizer is deflected downward and is attached to a back surface of the backlight module.

In an embodiment of this application, the periphery of the polarizer is attached to the surface periphery of the backlight module by using an adhesive.

In an embodiment of this application, a local periphery of the polarizer is designed to extend toward the backlight module, and is attached to the surface periphery of the backlight module.

In an embodiment of this application, the display panel comprises a display region and a boundary region surrounding the display region, an auxiliary sheet is disposed on a portion, opposite to the boundary region, of the polarizer, and a polarization direction of the polarizer and a polarization direction of the auxiliary sheet are perpendicular to each other.

In an embodiment of this application, the polarizer comprises a primary sheet and an auxiliary sheet, the primary sheet is attached to an outer surface of the display panel, and the auxiliary sheet is attached to a periphery of an outer surface of the primary sheet, is designed to extend toward the backlight module, and is attached to the surface periphery of the backlight module.

In an embodiment of this application, the periphery of the polarizer is pretreated by using a chemical reagent, so that a portion, opposite to a periphery of the display panel, of the polarizer is dehydrated and carbonized to form a shielding region.

In an embodiment of this application, the chemical reagent is a corrosive reagent.

Another objective of this application is to provide a method for manufacturing a display, comprising: providing a backlight module; disposing a display panel on an outer surface of the backlight module; and forming a polarizer on the display panel, where a periphery of the polarizer is designed to extend toward the backlight module, and is attached to a surface periphery of the backlight module.

The following technical measures may be taken to further resolve the technical problem of this application.

In an embodiment of this application, in the manufacturing method, the polarizer is deflected downward and is attached to a side edge of the backlight module, or is attached to a side edge and a back surface of the backlight module.

In an embodiment of this application, in the manufacturing method, the periphery of the polarizer is attached to the surface periphery of the backlight module by using an adhesive.

In an embodiment of this application, in the manufacturing method, the periphery of the polarizer is pretreated by using a chemical reagent, so that a portion, opposite to a periphery of the display panel, of the polarizer is dehydrated and carbonized to form a shielding region.

In an embodiment of this application, in the manufacturing method, the chemical reagent is a corrosive reagent.

Still another objective of this application is to provide a display, comprising: a backlight module; a display panel, disposed on the backlight module, where the display panel comprises a display region and a boundary region surrounding the display region; and a polarizer, disposed on the display panel, where a periphery of the polarizer is designed to extend toward the backlight module, and is attached to a surface periphery of the backlight module. The polarizer is deflected downward and is attached to a side edge of the backlight module, or a side edge and a back surface of the backlight module. An auxiliary sheet is disposed on a part, opposite to the boundary region, of the polarizer, and a polarization direction of the polarizer and a polarization direction of the auxiliary sheet are perpendicular to each other.

In an embodiment of this application, the periphery of the polarizer is pretreated by using a chemical reagent, so that a portion, opposite to a boundary region of the display panel, of the polarizer is dehydrated and carbonized to form a shielding region, or the periphery of the polarizer is pretreated at a high temperature and a high pressure, so that a portion, opposite to a boundary region of the display panel, of the polarizer is dehydrated and carbonized to form a shielding region.

In an embodiment of this application, the chemical reagent is a corrosive reagent.

This application resolves a problem that it is not easy to secure a panel to a backlight module, improves a production yield of products, and simplifies a manufacturing process. Secondly, the display panel and the backlight module can be laminated without a seam, and an appearance is more beautiful.

DETAILED DESCRIPTION

Figure 1:
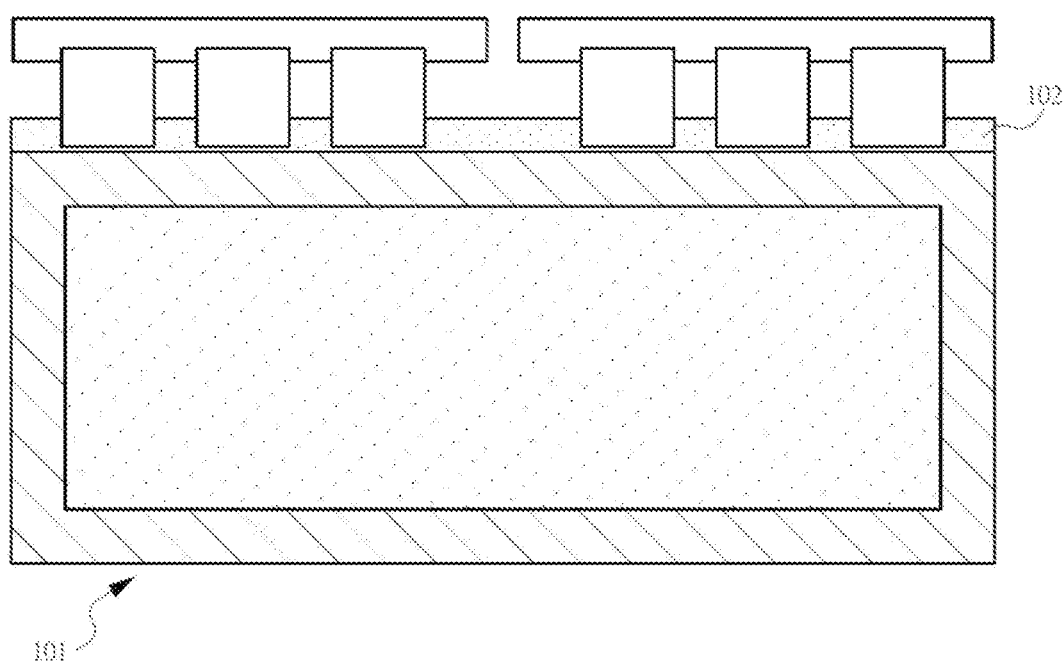
FIG. 1 is a schematic diagram of a display according to an embodiment of this application.

The following embodiments are described with reference to the accompanying drawings, which are used to exemplify specific embodiments for implementation of this application. Terms about directions mentioned in this application, such as "on", "below", "front", "back", "left", "right", "in", "out", and "side surface" merely refer to directions of the accompanying drawings. Therefore, the used terms about directions are used to describe and understand this application, and are not intended to limit this application.

The accompanying drawings and the description are considered to be essentially exemplary, rather than limitative. In the drawings, in figures, units with similar structures are represented by using a same reference number. In addition, for understanding and ease of description, a size and a thickness of each component shown in the accompanying drawings are arbitrarily shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a substrate is described to be "on" "another component", the component may be directly on the another component, or there may be an intermediate component.

In addition, in this specification, unless otherwise explicitly described to have an opposite meaning, the word "include" is understood as including the component, but not excluding any other component. In addition, in this specification, "on" means that a component is located on or below a target component, but does not mean that the component needs to be located on top of a gravity direction.

To further describe technical measure taken in this application for achieving a predetermined application objective and effects of this application, the following describes specific implementations, structures, features, and effects of a display and a method for manufacturing the same provided according to this application in detail with reference to the accompany drawings and preferred embodiments.

A display panel of this application may include an active switch (for example, Thin Film Transistor (TFT)) array substrate, a color filter (CF) substrate, and a liquid crystal layer formed between the two substrates.

In some embodiments, the display panel may be a curved-surface display panel.

In some embodiments, the active switch array and the CF of this application may be formed on a same substrate.

FIG. 1 is a schematic diagram of a liquid crystal display according to an embodiment of this application. Referring to FIG. 1, in an embodiment of this application, a bezel-less liquid crystal display 101 is provided, and in terms of design, whether a bezel of the liquid crystal display 101 needs to be protected by using an adhesive material 102 is determined according to requirements.

Figure 2:
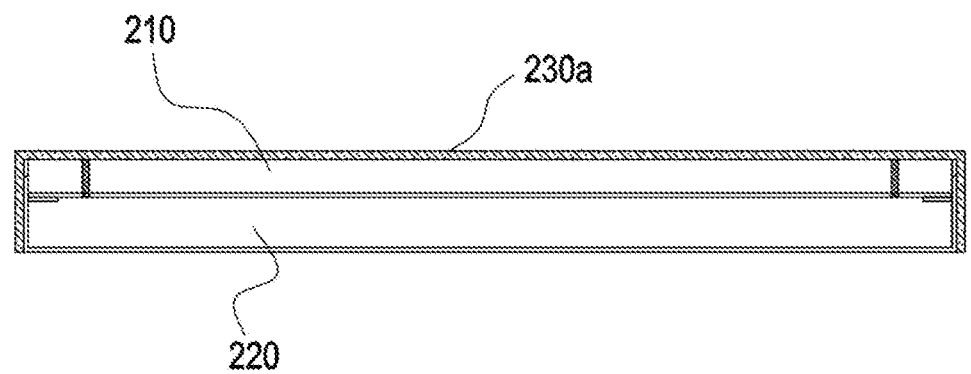
FIG. 2 is a schematic diagram of a polarizer attached to a side edge of a backlight module according to an embodiment of this application.
Figure 3:
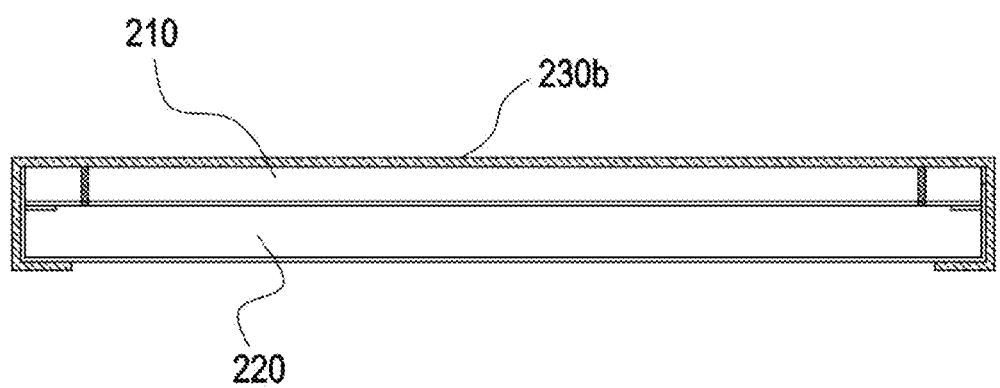
FIG. 3 is a schematic diagram of a polarizer attached to a back surface of a backlight module according to an embodiment of this application.

FIG. 2 is a schematic diagram of a polarizer attached to a side of a backlight module according to an embodiment of this application, and FIG. 3 is a schematic diagram of a polarizer attached to a back surface of a backlight module according to an embodiment of this application. Referring to FIG. 2, a display includes a backlight module 220, a display panel 210, and a polarizer 230a. The display panel 210 is disposed on the backlight module 220. The polarizer 230a is disposed on the display panel 210. A periphery of the polarizer 230a is designed to extend toward the backlight module 220, and is attached to a surface periphery of the backlight module 220.

In some embodiments, as shown in FIG. 2, the polarizer 230a is deflected downward and is attached to a side edge of the backlight module 220.

In some embodiments, as shown in FIG. 3, the polarizer 230b is deflected downward and is attached to a back surface of the backlight module 220.

In some embodiments, the polarizer 230b is deflected downward and is attached to a side edge and a back surface of the backlight module 220.

In some embodiments, a periphery of the polarizer (230a, 230b) is attached to a surface periphery of the backlight module 220 by using an adhesive. An attachment method is as stated above. The periphery of the polarizer may be attached to a side edge, a back surface, or both the side edge and the back surface of the backlight module 220.

In some embodiments, a local periphery of the polarizer (230a, 230b) is designed to extend toward the backlight module 220, and is attached to the surface periphery of the backlight module 220. For example, in a schematic diagram of a liquid crystal display shown in FIG. 1, a source driver end thereof is designed by using a chip on film (COF). In terms of design, some displays needs to be protected by the adhesive material 102. Therefore, in the design of the polarizer (230a, 230b), particular widths of a left side portion, a right side portion, and a lower side (a non-source driver end) portion are reserved for deflecting the polarizer and attaching the polarizer to a surface of the backlight module 220. In some embodiments, different side portions of the polarizer (230a, 230b) may be selectively reserved. For example, a width of a local side edge is selectively reserved on a left side, a right side, or a lower side of the polarizer (230a, 230b).

In some embodiments, the periphery of the polarizer (230a, 230b) is pretreated by using a chemical reagent, so that a portion, opposite to a periphery of the display panel 210, of the polarizer (230a, 230b) is dehydrated and carbonized to form a shielding region.

In some embodiments, the chemical reagent is a corrosive reagent.

In some embodiments, the periphery of the polarizer (230a, 230b) is pretreated at a high temperature and a high pressure, so that a portion, opposite to the periphery of the display panel, of the polarizer (230a, 230b) is carbonized to form a shielding region.

In some embodiments, the shielding region is of a dark light-absorbing material, and may be of a black substance.

In some embodiments, the material of the black substance includes phenol formaldehyde resin, a photosensitive compound, an organic colored polymer dye, an inorganic colored dye, and a solvent. The phenol formaldehyde resin, the photosensitive compound, the organic colored polymer dye, the inorganic colored dye, and the solvent are mixed with each other. Preferably, a weight percentage of the phenol formaldehyde resin is in a range of 25% to 50%, a weight percentage of the photosensitive compound is in a range of 1% to 5%, a weight percentage of the organic colored polymer dye is in a range of 1% to 20%, and a weight percentage of the solvent is in a range of 50% to 75%. The solvent may be propylene glycol monomethyl ether acetate.

In some embodiments, the polarizer includes a polarizing material layer. For values of a refractive index and an extinction coefficient of the polarizing material, preferably, the value of the refractive index is in a range of 2.0 to 3.2, and the value of the extinction coefficient is in a range of 2.7 to 3.5 for optimizing an extinction ratio. A polarizing material satisfying the refractive index and the extinction coefficient, specifically, may, for example, be a molybdenum disilicide material (hereinafter, sometimes, referred to as a MoSi material) containing molybdenum (Mo) and silicone (Si) or a nitride molybdenum disilicide material, and preferably, be a molybdenum disilicide material because it is easy to adjust values of the refractive index and the extinction coefficient according to contents of elements, such as Mo, Si, nitrogen, and oxygen, included in the molybdenum disilicide material, and the refractive index and the extinction coefficient can be easily satisfied under a wavelength of an ultraviolet area because the molybdenum disilicide material has light resistance against a short wavelength of the ultraviolet area, and is suitable for being used for alignment of an optical alignment film of a liquid crystal display device.

Figure 4:
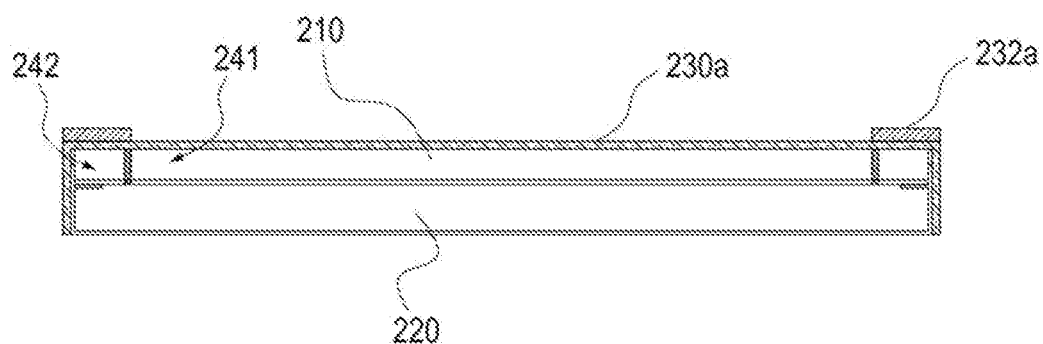
FIG. 4 is a schematic diagram of a polarizer attached to an auxiliary sheet according to an embodiment of this application.

FIG. 4 is a schematic diagram of a polarizer attached to an auxiliary sheet according to an embodiment of this application. The display panel 210 includes a display region 241 and a boundary region 242, and the boundary region 242 surrounds the display region 241 and is disposed around the display region 241. An auxiliary sheet 232a is disposed on a part, opposite to the boundary region 242, of the polarizer 230a. In this embodiment, the auxiliary sheet 232a is disposed on the polarizer 230a. However, the auxiliary sheet 232a may be disposed, according to design requirements, on the polarizer 230b shown in FIG. 3.

In an embodiment, the auxiliary sheet 232a is attached to an upper part of the polarizer 230b, and directly faces an upper part of a gate drive circuit area of the display panel 210.

In an embodiment, a polarization direction of the polarizer 230a and a polarization direction of the auxiliary sheet 232a are perpendicular to each other.

Figure 5A:
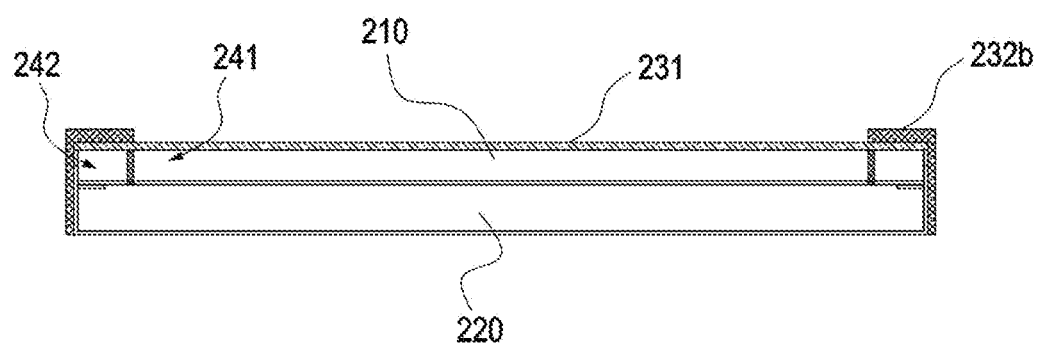
FIG. 5A and FIG. 5B are schematic diagrams of a combined polarizer structure according to an embodiment of this application.
Figure 5B:
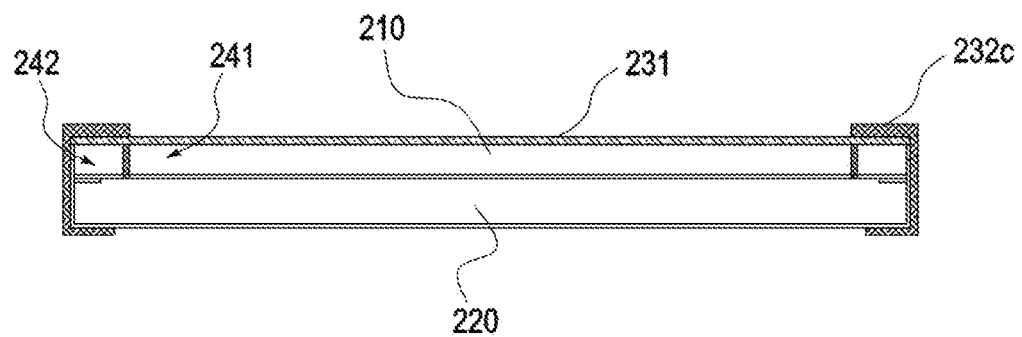

FIG. 5A and FIG. 5B are schematic diagrams of a combined polarizer structure according to an embodiment of this application. The polarizer includes a primary sheet 231 and an auxiliary sheet (232b, 232c). The primary sheet 231 is attached to an outer surface of the display panel 210. The auxiliary sheet (232b, 232c) is attached to a periphery of an outer surface of the primary sheet 231, is designed to extend toward the backlight module 220, and is attached to a surface periphery of the backlight module 220.

In an embodiment, as shown in FIG. 5A, a cross section of the auxiliary sheet 232b is L-shaped, or as shown in FIG. 5B, a cross section of the auxiliary sheet 232c is inwardly concave.

In an embodiment, a part of the primary sheet 231 to which the auxiliary sheet (232b, 232c) is attached is a part on an upper part of the primary sheet 231 and opposite to the boundary region 242.

In an embodiment, on a part of the primary sheet 231 to which the auxiliary sheet (232b, 232c) is attached, a polarization direction of the auxiliary sheet and a polarization direction of the primary sheet 231 are perpendicular to each other.

In an embodiment, a part of the primary sheet 231 to which the auxiliary sheet (232b, 232c) is attached directly faces an upper part of a gate drive circuit area of the display panel 210.

In some embodiments, the periphery of the primary sheet 231 is pretreated by using a chemical reagent, or a part of the primary sheet 231 to which the auxiliary sheet (232b, 232c) is attached is treated, that is, a part opposite to the boundary region 242 is dehydrated and carbonized to form a shielding region.

In some embodiments, the chemical reagent is a corrosive reagent.

In some embodiments, the periphery of the primary sheet 231 is pretreated at a high temperature and a high pressure, or a part of the primary sheet 231 to which the auxiliary sheet (232b, 232c) is attached is treated, that is, a part opposite to the boundary region 242 is dehydrated and carbonized to form a shielding region.

In some embodiments, the shielding region is of a dark light-absorbing material, and may be of a black substance.

In some embodiments, the material of the black substance includes phenol formaldehyde resin, a photosensitive compound, an organic colored polymer dye, an inorganic colored dye, and a solvent. The phenol formaldehyde resin, the photosensitive compound, the organic colored polymer dye, the inorganic colored dye, and the solvent are mixed with each other. Preferably, a weight percentage of the phenol formaldehyde resin is in a range of 25% to 50%, a weight percentage of the photosensitive compound is in a range of 1% to 5%, a weight percentage of the organic colored polymer dye is in a range of 1% to 20%, and a weight percentage of the solvent is in a range of 50% to 75%. The solvent may be propylene glycol monomethyl ether acetate.

In some embodiments, the polarizer includes a polarizing material layer. For values of a refractive index and an extinction coefficient of the polarizing material, preferably, the value of the refractive index is in a range of 2.0 to 3.2, and the value of the extinction coefficient is in a range of 2.7 to 3.5 for optimizing an extinction ratio. A polarizing material satisfying the refractive index and the extinction coefficient, specifically, may, for example, be a molybdenum disilicide material (hereinafter, sometimes, referred to as a MoSi material) containing molybdenum (Mo) and silicone (Si) or a nitride molybdenum disilicide material, and preferably, be a molybdenum disilicide material because it is easy to adjust values of the refractive index and the extinction coefficient according to contents of elements, such as Mo, Si, nitrogen, and oxygen, included in the molybdenum disilicide material, and the refractive index and the extinction coefficient can be easily satisfied under a wavelength of an ultraviolet area because the molybdenum disilicide material has light resistance against a short wavelength of the ultraviolet area, and is suitable for being used for alignment of an optical alignment film of a liquid crystal display device.

Referring to FIG. 2 to FIG. 5B, in an embodiment of this application, a method for manufacturing a display includes: providing a backlight module 220; disposing a display panel 210 on an outer surface of the backlight module 220; and forming a polarizer (230a, 230b) on the display panel 210. A periphery of the polarizer (230a, 230b) is designed to extend toward the backlight module 220, and is attached to a surface periphery of the backlight module 220.

In some embodiments, in the manufacturing method, the forming a polarizer on the display panel 210 includes that: as shown in FIG. 2, the polarizer 230a is deflected downward and is attached to a side edge of the backlight module 220.

In some embodiments, in the manufacturing method, the forming a polarizer on the display panel 210 includes that: as shown in FIG. 3, the polarizer 230b is deflected downward and is attached to a back surface of the backlight module 220.

In some embodiments, in the manufacturing method, the forming a polarizer on the display panel 210 includes that: the polarizer 230b is deflected downward and is attached to a side edge and a back surface of the backlight module 220.

In some embodiments, in the manufacturing method, the forming a polarizer (230a, 230b) on the display panel 210 includes that a periphery of the polarizer (230a, 230b) is attached to a surface periphery of the backlight module 220 by using an adhesive. An attachment method is as stated above. The periphery of the polarizer may be attached to a side edge, a back surface, or both the side edge and the back surface of the backlight module 220.

In some embodiments, the periphery of the polarizer (230a, 230b) is pretreated by using a chemical reagent, so that a portion, opposite to a periphery of the display panel 210, of the polarizer (230a, 230b) is dehydrated and carbonized to form a shielding region.

In some embodiments, the chemical reagent is a corrosive reagent.

In some embodiments, the periphery of the polarizer (230a, 230b) is pretreated at a high temperature and a high pressure, so that a portion, opposite to the periphery of the display panel, of the polarizer (230a, 230b) is carbonized to form a shielding region.

In some embodiments, the shielding region is of a dark light-absorbing material, and may be of a black substance.

In some embodiments, the material of the black substance includes phenol formaldehyde resin, a photosensitive compound, an organic colored polymer dye, an inorganic colored dye, and a solvent. The phenol formaldehyde resin, the photosensitive compound, the organic colored polymer dye, the inorganic colored dye, and the solvent are mixed with each other. Preferably, a weight percentage of the phenol formaldehyde resin is in a range of 25% to 50%, a weight percentage of the photosensitive compound is in a range of 1% to 5%, a weight percentage of the organic colored polymer dye is in a range of 1% to 20%, and a weight percentage of the solvent is in a range of 50% to 75%. The solvent may be propylene glycol monomethyl ether acetate.

In some embodiments, the polarizer includes a polarizing material layer. For values of a refractive index and an extinction coefficient of the polarizing material, preferably, the value of the refractive index is in a range of 2.0 to 3.2, and the value of the extinction coefficient is in a range of 2.7 to 3.5 for optimizing an extinction ratio. A polarizing material satisfying the refractive index and the extinction coefficient, specifically, may, for example, be a molybdenum disilicide material (hereinafter, sometimes, referred to as a MoSi material) containing molybdenum (Mo) and silicone (Si) or a nitride molybdenum disilicide material, and preferably, be a molybdenum disilicide material because it is easy to adjust values of the refractive index and the extinction coefficient according to contents of elements, such as Mo, Si, nitrogen, and oxygen, included in the molybdenum disilicide material, and the refractive index and the extinction coefficient can be easily satisfied under a wavelength of an ultraviolet area because the molybdenum disilicide material has light resistance against a short wavelength of the ultraviolet area, and is suitable for being used for alignment of an optical alignment film of a liquid crystal display device.

In some embodiments, in the manufacturing method, the forming a polarizer on the display panel 210 includes that: as shown in FIG. 4, the display panel 210 includes a display region 241 and a boundary region 242, and the boundary region 242 surrounds the display region 241 and is disposed around the display region 241. An auxiliary sheet 232a is disposed on a part, opposite to the boundary region 242, of the polarizer 230a. In some embodiments, the auxiliary sheet 232a can be designed and disposed on the polarizer 230b shown in FIG. 3.

In some embodiments, in the manufacturing method, the forming a polarizer on the display panel 210 includes that: the auxiliary sheet 232a is attached to an upper part of the polarizer (230a, 230b) and directly faces an upper part of a gate drive circuit area of the display panel 210.

In some embodiments, in the manufacturing method, the forming a polarizer on the display panel 210 includes that: a polarization direction of the polarizer (230a, 230b) and a polarization direction of the auxiliary sheet 232a are perpendicular to each other.

In some embodiments, in the manufacturing method, the forming a polarizer on the display panel 210 includes that: as shown in FIG. 5A and FIG. 5B, the polarizer includes a primary sheet 231 and an auxiliary sheet (232b, 232c). The primary sheet 231 is attached to an outer surface of the display panel 210. The auxiliary sheet (232b, 232c) is attached to a periphery of an outer surface of the primary sheet 231, is designed to extend toward the backlight module 220, and is attached to a surface periphery of the backlight module 220.

In some embodiments, in the manufacturing method, as shown in FIG. 5A, a cross section of the auxiliary sheet 232b is L-shaped, or as shown in FIG. 5B, a cross section of the auxiliary sheet 232c is inwardly concave.

In some embodiments, in the manufacturing method, a part of the primary sheet 231 to which the auxiliary sheet (232b, 232c) is attached is a part on an upper part of the primary sheet 231 and opposite to the boundary region 242.

In some embodiments, in the manufacturing method, at a part of the primary sheet 231 to which the auxiliary sheet (232b, 232c) is attached, a polarization direction of the auxiliary sheet and a polarization direction of the primary sheet 231 are perpendicular to each other.

In some embodiments, in the manufacturing method, a part of the primary sheet 231 to which the auxiliary sheet (232b, 232c) is attached directly faces an upper part of a gate drive circuit area of the display panel 210.

In some embodiments, in the manufacturing method, the periphery of the primary sheet 231 is pretreated by using a chemical reagent, or a part of the primary sheet 231 to which the auxiliary sheet (232b, 232c) is attached is treated, that is, a part opposite to the boundary region 242 is dehydrated and carbonized to form a shielding region.

In some embodiments, in the manufacturing method, the chemical reagent is a corrosive reagent.

In some embodiments, in the manufacturing method, the periphery of the primary sheet 231 is pretreated at a high temperature and a high pressure, or a part of the primary sheet 231 to which the auxiliary sheet (232b, 232c) is attached is treated, that is, a part opposite to the boundary region 242 is dehydrated and carbonized to form a shielding region.

In some embodiments, the shielding region is of a dark light-absorbing material, and may be of a black substance.

In some embodiments, the material of the black substance includes phenol formaldehyde resin, a photosensitive compound, an organic colored polymer dye, an inorganic colored dye, and a solvent. The phenol formaldehyde resin, the photosensitive compound, the organic colored polymer dye, the inorganic colored dye, and the solvent are mixed with each other. Preferably, a weight percentage of the phenol formaldehyde resin is in a range of 25% to 50%, a weight percentage of the photosensitive compound is in a range of 1% to 5%, a weight percentage of the organic colored polymer dye is in a range of 1% to 20%, and a weight percentage of the solvent is in a range of 50% to 75%. The solvent may be propylene glycol monomethyl ether acetate.

In some embodiments, the polarizer includes a polarizing material layer. For values of a refractive index and an extinction coefficient of the polarizing material, preferably, the value of the refractive index is in a range of 2.0 to 3.2, and the value of the extinction coefficient is in a range of 2.7 to 3.5 for optimizing an extinction ratio. A polarizing material satisfying the refractive index and the extinction coefficient, specifically, may, for example, be a molybdenum disilicide material (hereinafter, sometimes, referred to as a MoSi material) containing molybdenum (Mo) and silicone (Si) or a nitride molybdenum disilicide material, and preferably, be a molybdenum disilicide material because it is easy to adjust values of the refractive index and the extinction coefficient according to contents of elements, such as Mo, Si, nitrogen, and oxygen, included in the molybdenum disilicide material, and the refractive index and the extinction coefficient can be easily satisfied under a wavelength of an ultraviolet area because the molybdenum disilicide material has light resistance against a short wavelength of the ultraviolet area, and is suitable for being used for alignment of an optical alignment film of a liquid crystal display device.

This application resolves a problem that it is not easy to secure a panel to a backlight module 220, improves a production yield of products, and simplifies a manufacturing process. Secondly, the display panel 210 and the backlight module 220 can be laminated without a seam, and an appearance is more beautiful.

Terms such as "in some embodiments" and "in various embodiments" are repeatedly used. Usually, the terms do not refer to a same embodiment; but they may also refer to a same embodiment. Words such as "comprise", "have", "include" are synonyms, unless other meanings are indicated in the context.

The foregoing descriptions are merely preferred embodiments of this application, and are not intended to limit this application in any form. Although this application has been disclosed above through the preferred embodiments, the embodiments are not intended to limit this application. Any person skilled in the art can make some equivalent variations or modifications according to the foregoing disclosed technical content without departing from the scope of the technical solutions of this application to obtain equivalent embodiments. Any simple amendment, equivalent change or modification made to the foregoing embodiments according to the technical essence of this application without departing from the content of the technical solutions of this application shall fall within the scope of the technical solutions of this application.

What is claimed is:

1. A display, comprising:
  a backlight module;
  a display panel, disposed on the backlight module, wherein the display panel comprises a display region and a boundary region surrounding the display region; and
  a polarizer, disposed on the display panel, wherein a periphery of the polarizer is designed to extend toward the backlight module, and is attached to a surface periphery of the backlight module; wherein
  the polarizer is deflected downward and is attached to a side edge of the backlight module, or is attached to a side edge and a back surface of the backlight module;
  an auxiliary sheet is disposed on a part, opposite to the boundary region, of the polarizer;
  a polarization direction of the polarizer and a polarization direction of the auxiliary sheet are perpendicular to each other;
  the periphery of the polarizer is pretreated by using a chemical reagent, so that a portion, opposite to a boundary region of the display panel, of the polarizer is dehydrated and carbonized to form a shielding region, or the periphery of the polarizer is pretreated at a high temperature and a high pressure, so that a portion, opposite to a boundary region of the display panel, of the polarizer is dehydrated and carbonized to form a shielding region; and
  the chemical reagent is a corrosive reagent.

2. The display according to claim 1, wherein the periphery of the polarizer is attached to the surface periphery of the backlight module by using an adhesive.

3. The display according to claim 1, wherein a local periphery of the polarizer is designed to extend toward the backlight module, and is attached to the surface periphery of the backlight module.

4. The display according to claim 1, wherein the polarizer comprises a primary sheet and an auxiliary sheet, the primary sheet is attached to an outer surface of the display panel, and the auxiliary sheet is attached to a periphery of an outer surface of the primary sheet, is designed to extend toward the backlight module, and is attached to the surface periphery of the backlight module.

5. A method for manufacturing a display, comprising:
providing a backlight module;
disposing a display panel on an outer surface of the backlight module; and
forming a polarizer on the display panel, wherein a periphery of the polarizer is designed to extend toward the backlight module, and is attached to a surface periphery of the backlight module; wherein
the polarizer is deflected downward and is attached to a side edge of the backlight module, or is attached to a side edge and a back surface of the backlight module;
an auxiliary sheet is disposed on a part, opposite to the boundary region, of the polarizer;
a polarization direction of the polarizer and a polarization direction of the auxiliary sheet are perpendicular to each other;
the periphery of the polarizer is pretreated by using a chemical reagent, so that a portion, opposite to a boundary region of the display panel, of the polarizer is dehydrated and carbonized to form a shielding region, or the periphery of the polarizer is pretreated at a high temperature and a high pressure, so that a portion, opposite to a boundary region of the display panel, of the polarizer is dehydrated and carbonized to form a shielding region; and
the chemical reagent is a corrosive reagent.

6. The method for manufacturing a display according to claim 5, wherein the periphery of the polarizer is attached to the surface periphery of the backlight module by using an adhesive.

* * * * *